Nov. 15, 1938.  C. A. CAMPBELL  2,136,573
AIR BRAKE
Filed Dec. 27, 1933
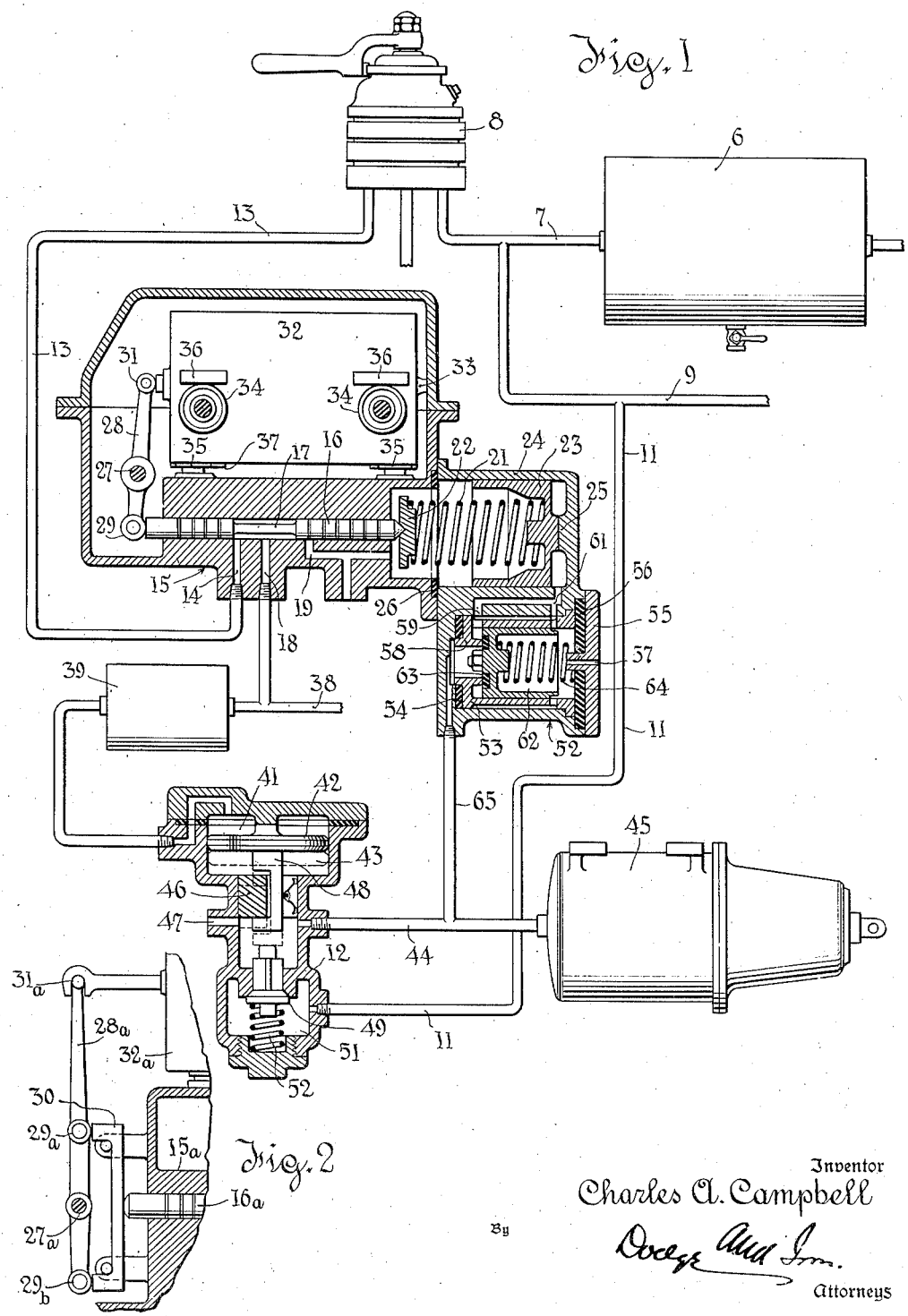
Inventor
Charles A. Campbell Patented Nov. 15, 1938

2,136,573

UNITED STATES PATENT OFFICE 2,136,573

AIR BRAKE

Charles A. Campbell, Watertown, N. Y., assignor to The New York Air Brake Company, a corporation of New Jersey Application December 27, 1933, Serial No. 704,186

24 Claims. (Cl. 303—24)

This invention relates to the control of vehicle brakes to produce a desired rate or rates of deceleration, and will be described as embodied in a pneumatic brake. The invention is, however, applicable to any power brake in which the intensity of application of the brakes is regulable, irrespective of the kind of power used. The power might, for example, be electrical or hydraulic so far as broad operative principles are concerned.

Inertia devices controlling brake applications have heretofore been proposed, but these devices as heretofore used function to produce a single substantially uniform decelerative rate throughout a stop. Because of changes of adhesion of the wheels to the rail and changes in the coefficient of brake shoe friction, each of which occurs with change of speed, it is desirable to change the deceleration rate as the vehicle nears, and before it reaches, a state of rest.

I have determined that with automatic control functioning to produce substantially uniform deceleration during a brake application, the force with which the brake is applied decreases as the vehicle approaches a state of rest. The present invention takes advantage of this fact and provides means to change (and specifically to reduce), the rate of deceleration maintained by the inertia device (or its equivalent) when the brake applying force reaches and passes below a chosen low value. This change in the rate of deceleration permits the vehicle to be brought rapidly and smoothly to rest.

Other features of novelty will be apparent from a consideration of the devices disclosed in the accompanying drawing, in which,—

Fig. 1 is a diagrammatic view, partly in section and partly in elevation, showing the invention applied to control straight air brakes of the relay valve type. The embodiment is for a train designed to run in only one direction (left as viewed in the drawing).

Fig. 2 shows a modification in which control is effected for forward and for reverse running of the train.

Referring first to Fig. 1, the main reservoir is shown at 6. This is connected by pipe 7 with the supply port of a straight air brake valve 8, and with the reservoir pipe 9 which extends throughout the train. The reservoir pipe 9 is connected by branch pipes, one of which appears at 11, with relay valves, one of which is indicated generally by the numeral 12. There is a relay valve 12 for each brake unit in the train.

The valve 8 may be manipulated to admit air under pressure to, and exhaust it from, a branch line 13 which leads to a port 14 in the body 15 of the deceleration control valve. This body 15 has a cylindrical bore in which works a balanced piston valve 16 having a reduced middle portion 17. When the valve is in its normal position, shown in the drawing, the reduced middle portion connects a control pipe port 18 with port 14, but when the valve 16 is forced to the right (as viewed in the drawing) this reduced middle portion connects control pipe port 18 with an atmospheric exhaust port 19. In the first-named position port 19 is blanked by valve 16, while in the second-named position port 14 is blanked by valve 16.

The valve 16 is constantly urged to the left by a coil compression spring 21 having a spring seat 22 engaging the end of the valve and an adjustable spring seat which takes the form of a piston 23 working in a cylinder 24. Motion of the piston 23 to the right is limited by a stop 25. Its motion to the left is limited by an annular shoulder 26 with sealing gasket as shown.

Pivoted on the fixed axis 27 is a lever 28 whose lower end carries a roller 29 engaging the left hand end of valve 16 and whose upper end carries a roller 31 engaging the left hand end of inertia weight 32. Since the train moves to the left relatively to the drawing, roller 31 engages the forward end of the weight. Rearward motion of the weight is limited by stop 33 which defines the normal or neutral position.

The weight 32 is guided for free right line motion in a line parallel with the path of travel of the train by means of rollers 34, 35, which engage track-like flanges 36, 37, on the weight.

The control port 18 is connected with control pipe 38. This extends throughout the train and is connected with the control chambers of the relay valves 12. In the case of the one relay valve illustrated the connection is through the small-volume reservoir 39 to the control chamber 41 on the outer side of piston 42. The chamber 43 at the inner side of the piston is connected by pipe 44 with brake cylinder 45. In chamber 43 is an exhaust controlling slide valve 46 actuated with lost motion by piston 42, and coacting with exhaust port 47. The lost motion connection is produced by mounting the valve in a notch longer than the valve, the notch being formed in piston stem 48.

The end of stem 48, after motion sufficient to cause valve 46 to close exhaust port 47, engages the pilot of the poppet inlet valve 49 and if moved further will unseat the same. Valve 49 controls flow of main reservoir air from chamber 51, to which pipe 11 is connected, to chamber 43 and thence by way of pipe 44 to brake cylinder 45. A spring 52 assists main reservoir pressure in urging valve 49 closed.

The relay valve, generally indicated at 12, is a device well known in the brake art. It functions to establish and maintain in the connected brake cylinder, pressures equal to those established from time to time in the control pipe 38.

To control the position of piston 23 a combined admission and exhaust valve, responsive to brake cylinder pressure, is used.

In a body 52, integral with cylinder 24, is mounted a cylinder bushing 53. This is sealed to the body at its inner end by gasket 54, while a cap 55 and gasket 56 seal the outer end. The cap 55 has an atmospheric vent port 57. At the inner end bushing 53 has an inlet port surrounded by a valve seat 58. An inlet port 59 and exhaust port 61 are formed near opposite ends of the bushing and both lead to the outer end of cylinder 24. The inner end of cylinder 24 is vented to atmosphere through exhaust passage 19.

Working in bushing 53 is a cup-shaped valve piston 62, having on its inner end a rubber or like facing 63 to engage seat 58. A coil compression spring 64 urges the piston inward. In its inner position it prevents flow from brake cylinder 45 through pipes 44 and 65 to the outer end of cylinder 24 and vents that end of the cylinder to atmosphere through ports 61 and 57. When forced outward piston 62 seats on gasket 56, closes exhaust through port 61, and admits brake cylinder air against the outer face of piston 23, forcing this piston to its inner limit of motion and adjusting the inertia device, which I call a decelerometer valve, to maintain a higher rate of deceleration.

It will be observed that when the piston 62 moves away from valve seat 58 its effective area is increased. This is a known expedient to cause such a piston to move full stroke when it starts.

Under running conditions the parts are in the positions shown. To produce an application the engineer manipulates the brake valve 8 and thus establishes in control pipe 38 a desired pressure. The relay valves 12 all respond to this pressure and establish substantially the same pressure in the brake cylinders. The strength of spring 64 and the relative diameters of piston 62 and valve seat 58 are so coordinated that at a relatively low brake cylinder pressure valve piston 62 will shift, admitting brake cylinder pressure against piston 23 and setting the inertia device to respond only to a high rate of deceleration.

Assuming that a full application is made by leaving the engineer's brake valve in application position, the momentum of weight 32 will cause it to move forward (to the left) relatively to the train as the train is decelerated by the brake application. Such motion shifts valve 16 a distance determined by the relation of the force exerted by the weight to the resistance offered by the spring. The force developed is a function of the rate of deceleration. Thus if the deceleration exceeds that for which the device is set, valve 16 exhausts pressure fluid from the control pipe while interrupting the supply of pressure fluid thereto. If the deceleration rate falls below that for which the device is set, exhaust is terminated and air is admitted to the control pipe. Between these two conditions the valve 16 assumes a lap position.

The effect is to decelerate the train at a substantially uniform rate, usually the maximum rate permissible. As the train slows the brake cylinder pressure will be reduced, because uniform deceleration requires reduced braking at slow speeds. At a definite, low brake cylinder pressure, valve piston 62 will move in cutting off the connection from brake cylinder to cylinder 24 and venting the cylinder. Piston 23 moves to its right hand limit of motion; the stress on spring 21 is reduced, and the inertia device functions to establish a new and much lower rate of deceleration.

Proper coordination of the parts gives a suitable change of deceleration rate at a time desirably close to the final arrest of the train, so that stops without jar, and without undue lengthening of the stopping distance, are made possible.

Devices of this character are useful chiefly on high speed trains, and the present trend of development of such trains is toward articulated trains with single-end control. Accordingly an inertia device, or decelerometer valve, adapted to only one direction of running, has been illustrated in Fig. 1. The possibility of modifying the device to operate for either direction of running is shown schematically in Fig. 2.

In Fig. 2 the weight 32a may move in either direction from its neutral position. Thus it might shift during acceleration of the train but would then be functionless. The neutral position is shown in Fig. 2. The weight has a pin and slot connection 31a with the upper end of lever 28a fulcrumed at 27a. Rollers 29a, 29b located on opposite sides of fulcrum 27a coact with floating lever 30 which in turn coacts with the end of valve 16a. The parts are so arranged that displacement of the weight 32a in either direction from the neutral position, shifts valve 16a to the right. Thus the device will function to control the brakes in the manner already described in response to deceleration produced by the brakes in either direction of train motion.

In the interests of a simple disclosure, only the important elements of the brake system have been disclosed. The invention, is, however, applicable to a wide range of brake systems, including those having well known safety features, and including others than straight air systems.

The claims of the present application are directed to a brake system embodying the deceleration mechanism above described. Claims drawn specifically to the structure of the deceleration mechanism form the subject matter of my co-pending application Serial No. 724,990, filed May 10, 1934, and consequently are not claimed herein.

What is claimed is,—

1. The method of controlling vehicle brakes, which comprises regulating the intensity of brake application in response to the deceleration produced by such application, to produce a substantially uniform deceleration rate; and changing such deceleration rate to a different uniform rate in response to change of the intensity of brake application.

2. The method of controlling vehicle brakes, which comprises regulating the intensity of brake application in response to the deceleration produced by such application, to produce a substantially uniform deceleration rate; and changing such deceleration rate to a different uniform rate in response to change of the intensity of brake application past a chosen value.

3. The method of controlling vehicle brakes, which comprises regulating the intensity of brake application in response to the deceleration produced by such application, to produce a substantially uniform deceleration rate; and reducing such deceleration rate to a lower uniform rate in response to reduction of the intensity of brake application below a chosen value.

4. The combination of controllable braking means for a vehicle; inertia means controlling said braking means and adapted to maintain uniform deceleration rates; means for adjusting said inertia means to change the rate maintained thereby; and means responsive to the intensity of energization of said braking means for actuating said adjusting means.

5. The combination of braking means for a vehicle including a brake cylinder; inertia means arranged to regulate the pressure in said cylinder during an application; means for adjusting said inertia means to vary its response; and means responsive to brake cylinder pressure for controlling said adjusting means.

6. The combination of braking means for a vehicle including a brake cylinder; inertia means arranged to regulate the pressure in said cylinder during an application; means for adjusting said inertia means to vary its response; and means responsive to reduction of brake cylinder pressure below a chosen value to actuate said adjusting means.

7. An inertia control for brakes comprising a movable inertia mass; brake controlling means operable by motion thereof; yielding means resisting such motion; and means responsive to the intensity of brake application for varying the resistance offered by said yielding means.

8. The combination defined in claim 7, in which the means responsive to intensity of application, functions to reduce the resistance of said yielding means when the intensity of application passes below a chosen value.

9. The combination of a brake cylinder; a movable inertia mass; admission and exhaust valve means controlling pressure in said brake cylinder and arranged to be actuated by motion of said mass; yielding means resisting such motion; and means responsive to brake cylinder pressure for changing the resistance offered by said yielding means.

10. The combination of a brake cylinder, a movable inertia mass; admission and exhaust valve means controlling pressure in said brake cylinder and arranged to be actuated by motion of said mass; yielding means resisting such motion; and means responsive to brake cylinder pressure for changing the resistance offered by said yielding means and comprising a motor, an admission and exhaust valve device controlling pressure acting on said motor, and a pressure actuated means subject to brake cylinder pressure and arranged to shift the last-named inlet and exhaust valve device; as brake cylinder pressure passes a chosen intensity.

11. The combination defined in claim 10, in which the pressure actuated means comprises a reciprocating abutment and means serving upon initial motion of the abutment from a limiting position, to change its effective area and cause it to move its full stroke.

12. A brake system comprising in combination, a source of fluid pressure; a reservoir pipe connected therewith; a control pipe; an engineer's brake valve controlling connection between said source and said control pipe and between said pipe and an exhaust; at least one braking unit comprising a brake cylinder and a relay, said relay being operable by changes in pressure in the control pipe alternatively to admit pressure fluid from the reservoir pipe to the brake cylinder and to exhaust pressure fluid from the brake cylinder; a valve having two positions, in one of which it connects the control pipe with the engineer's brake valve, and in the other of which it isolates said pipe from the brake valve and vents pressure fluid from the control pipe; and an inertia device for shifting the last-named valve.

13. A brake system comprising in combination, a source of fluid pressure; a reservoir pipe connected therewith; a control pipe; an engineer's brake valve controlling connection between said source and said control pipe and between said pipe and an exhaust; at least one braking unit comprising a brake cylinder and a relay, said relay being operable by changes in pressure in the control pipe alternatively to admit pressure fluid from the reservoir pipe to the brake cylinder and to exhaust pressure fluid from the brake cylinder; a valve having two positions, in one of which it connects the control pipe with the engineer's brake valve, and in the other of which it isolates said pipe from the brake valve and vents pressure fluid from the control pipe; an inertia device for shifting the last-named valve; and means for adjustably loading said inertia device to vary its response.

14. A brake system comprising in combination, a source of fluid pressure; a reservoir pipe connected therewith; a control pipe; an engineer's brake valve controlling connection between said source and said control pipe and between said pipe and an exhaust; at least one braking unit comprising a brake cylinder and a relay, said relay being operable by changes in pressure in the control pipe alternatively to admit pressure fluid from the reservoir pipe to the brake cylinder and to exhaust pressure fluid from the brake cylinder; a valve having two positions, in one of which it connects the control pipe with the engineer's brake valve, and in the other of which it isolates said pipe from the brake valve and vents pressure fluid from the control pipe; an inertia device for shifting the last-named valve; and means responsive to brake cylinder pressure for variably loading said inertia device to vary its response.

15. A brake system comprising in combination, a source of fluid pressure; a reservoir pipe connected therewith; a control pipe; an engineer's brake valve controlling connection between said source and said control pipe and between said pipe and an exhaust; at least one braking unit comprising a brake cylinder and a relay, said relay being operable by changes in pressure in the control pipe alternatively to admit pressure fluid from the reservoir pipe to the brake cylinder and to exhaust pressure fluid from the brake cylinder; a valve having two positions, in one of which it connects the control pipe with the engineer's brake valve, and in the other of which it isolates said pipe from the brake valve and vents pressure fluid from the control pipe; an inertia device for shifting the last-named valve; adjustable means for loading said inertia device; and means responsive to reduction of brake cylinder pressure below a chosen value to shift said adjustable means and thus reduce such loading.

16. In a fluid pressure brake system, the combination of an engineer's brake valve; a device to and from which said brake valve admits and exhausts pressure fluid to apply and release the brakes; a balanced modulating valve of the admission and exhaust type interposed between said brake valve and said device, said valve opening an admission and exhaust port selectively and progressively; and means responsive to deceleration produced by brake application for actuating said modulating valve.

17. In a fluid pressure brake system, the combination of an engineer's brake valve; a device to and from which said brake valve admits and exhausts pressure fluid to apply and release the brakes; a modulating valve of the admission and exhaust type interposed between said brake valve and said device, said valve opening an admission and exhaust port selectively and progressively; means responsive to deceleration produced by brake application for actuating said modulating valve; and means responsive to the variation of intensity of a brake application past a chosen value for adjusting the last-named means to change the deceleration rate at which it responds.

18. In a vehicle brake system, the combination with a brake cylinder and a supply reservoir, of a control pipe, a brake controlling valve device for supplying fluid under pressure to said control pipe, means responsive to the degree of pressure established in said control pipe for effecting a supply of fluid under pressure from said supply reservoir to said brake cylinder to a corresponding degree, and a retardation controller device operable to control the pressure in said control pipe when the rate of retardation produced by an application of the brakes exceeds a chosen value.

19. A brake system comprising in combination, a source of fluid pressure; a pipe normally charged therefrom; a control pipe; an engineer's brake valve controlling connection between said source and said control pipe and between said pipe and an exhaust; at least one braking unit comprising a brake cylinder and a relay, said relay being operable by changes in pressure in the control pipe alternatively to admit pressure fluid from said normally charged pipe to the brake cylinder and to exhaust pressure fluid from the brake cylinder; a valve having two positions, in one of which it connects the control pipe with the engineer's brake valve, and in the other of which it isolates said pipe from the brake valve and vents pressure fluid from the control pipe; and an inertia device for shifting the last-named valve.

20. A brake system comprising in combination, a source of fluid pressure; a pipe normally charged therefrom; a control pipe; an engineer's brake valve controlling conections between said source and said control pipe and between said pipe and an exhaust, at least one braking unit comprising a brake cylinder and a relay, said relay being operable by changes in pressure in the control pipe alternatively to admit pressure fluid from said normally charged pipe to the brake cylinder and to exhaust pressure fluid from the brake cylinder; a valve having two positions, in one of which it connects the control pipe with the engineer's brake valve, and in the other of which it isolates said pipe from the brake valve and vents pressure fluid from the control pipe; an inertia device for shifting the last-named valve; and means for adjustably loading said inertia device to vary its response.

21. A brake system comprising in combination, a source of fluid pressure; a pipe normally charged therefrom; a control pipe; an engineer's brake valve controlling connection between said source and said control pipe and between said pipe and an exhaust; at least one braking unit comprising a brake cylinder and a relay, said relay being operable by changes in pressure in the control pipe alternatively to admit pressure fluid from said normally charged pipe to the brake cylinder and to exhaust pressure fluid from the brake cylinder; a valve having two positions, in one of which it connects the control pipe with the engineer's brake valve, and in the other of which it isolates said pipe from the brake valve and vents pressure fluid from the control pipe; an inertia device for shifting the last-named valve; and pressure controlled means for variably loading said inertia device to vary its response.

22. In a vehicle brake system, in combination, a brake cylinder, means for effecting a supply of fluid under pressure to the brake cylinder, a retardation controller device having an element movable according to the rate of retardation of the vehicle, means responsive to movement of said element for effecting a release of fluid under pressure from the brake cylinder, means for governing at what rate of retardation said last means responds to movement of said element, and means for controlling said governing means according to brake cylinder pressure.

23. In a vehicle brake system, in combination, a brake cylinder, means for effecting a supply of fluid under pressure to the brake cylinder, a retardation controller device operable according to the rate of retardation of the vehicle, means responsive to operation of said retardation controller device at a chosen rate of retardation for effecting a release of fluid under pressure from the brake cylinder, and means directly operated by an increase in pressure varying according to the increase of fluid supplied to the brake cylinder for varying the chosen rate at which the retardation controller device operates.

24. In a vehicle brake system, in combination, a brake cylinder, means for supplying fluid under pressure to the brake cylinder to effect an application of the brakes, means operated according to the rate of retardation of the vehicle for subsequently controlling the brake cylinder pressure, and means directly operated by an increase in pressure varying according to the increase in pressure of fluid suplied to the brake cylinder to increase the rate of retardation at which said last means operates.

CHARLES A. CAMPBELL.

DISCLAIMER 2,136,573.—*Charles A. Campbell*, Watertown, N. Y. AIR BRAKE. Patent dated November 15, 1938. Disclaimer filed March 8, 1941, by the assignee, *The New York Air Brake Company*.

Hereby enters this disclaimer to claim 7 of said patent.

[*Official Gazette April 1, 1941.*]